(12) United States Patent
Armour et al.

(10) Patent No.: US 7,680,199 B2
(45) Date of Patent: Mar. 16, 2010

(54) COMMUNICATIONS SYSTEMS

(75) Inventors: Simon Armour, Bath (GB); Angela Doufexi, Bristol (GB); Joseph Mc Geertvaw, Corsrian (GB)

(73) Assignee: Kyocera Corporation, Kyoto (JP)

( * ) Notice: Subject to any disclaimer, the term of this patent is extended or adjusted under 35 U.S.C. 154(b) by 1084 days.

(21) Appl. No.: 11/193,045

(22) Filed: Jul. 29, 2005

(65) Prior Publication Data

US 2006/0126749 A1    Jun. 15, 2006

(30) Foreign Application Priority Data

Jul. 30, 2004    (GB) ................. 0417171.6

(51) Int. Cl.
*H04K 1/10* (2006.01)

(52) U.S. Cl. ........................... 375/260
(58) Field of Classification Search .......... 375/260
See application file for complete search history.

(56) References Cited

U.S. PATENT DOCUMENTS

| | | | |
|---|---|---|---|
| 5,726,978 A | 3/1998 | Frodigh et al. | |
| 6,751,444 B1 | 6/2004 | Meiyappan | |
| 7,020,110 B2* | 3/2006 | Walton et al. | 370/334 |
| 7,069,009 B2* | 6/2006 | Li et al. | 455/446 |
| 2002/0159422 A1* | 10/2002 | Li et al. | 370/342 |
| 2003/0169681 A1* | 9/2003 | Li et al. | 370/203 |
| 2004/0022180 A1* | 2/2004 | Stolpman et al. | 370/208 |
| 2004/0127245 A1 | 7/2004 | Sadri et al. | |
| 2005/0031047 A1* | 2/2005 | Maltsev et al. | 375/260 |

OTHER PUBLICATIONS

Cheong Yui Wong; Tsui, C.Y.; Cheng, R.S.; Letaief, K.B.; "A real-time sub-carrier allocation scheme for multiple access downlink OFDM transmission," IEEE Vehicular Technology Conference, 1999. VTC 1999—Fall. IEEE VTS 50th, vol. 2, Sep. 19-22, 1999 pp. 1124-128 vol. 2.*
Y. Peng and S. Amour, "An investigation of adaptive sub-carrier allocation in OFDMA systems," in Proc. Veh. Technol. Conf., Stockholm, Sweden, Spring 2005, pp. 1808-1811.*
Rhee, et al., "Increase In Capacity of Multiuser OFDM System Using Dynamic Subchannel Allocation", 2000 IEEE 51$^{st}$ Vehicular Technology Conference Proceedings. Tokyo, Japan, May 15-18, 2000.
Jang, et al., "Transmit Power Adaptation for Multi-User OFDM Systems", IEEE Journal on Selected Areas in Communications, vol. 21, Issue 2, Feb. 2003, pp. 171-178.

* cited by examiner

*Primary Examiner*—David C Payne
*Assistant Examiner*—Nader Bolourchi
(74) *Attorney, Agent, or Firm*—Hogan & Hartson LLP

(57) ABSTRACT

In a multi user communication system, subcarriers are allocated to subchannels using a quality measurement for each subchannel. An initial sub carrier is allocated to each subchannel, and a quality metric measured. Subsequent subcarriers are allocated in dependence upon the quality measurement for each subchannel. The subchannel with the lowest quality measurement receives the first allocation, and the subchannel with the highest quality measurement receives the last allocation. The subsequent allocation is repeated, following a re-sort of the subchannel quality measurements, until all of the subcarriers are allocated.

48 Claims, 16 Drawing Sheets

COMMUNICATIONS SYSTEMS

The present invention relates to communications systems, and to dynamic multi-user subcarrier allocation in a coded orthogonal frequency division multiple access (OFDMA) radio frequency communications system in particular.

BACKGROUND OF THE PRESENT INVENTION

In a frequency selective fading channel, different subcarriers will experience different channel gains. In traditional Orthogonal Frequency Division Multiplex (OFDM) time division multiple access (TDMA) systems each user transmits on all sub-carriers simultaneously and users share the channel in time. If the channel is perfectly known to the transmitter, the so-called "water-filling" policy (that is, more power when the channel gain is high and less power when the channel gain is low) is known to be optimal in maximising the data rate. The increase of data rate, by using transmit power allocation in a single user OFDM system is due to spectral diversity effects.

In Orthogonal Frequency Division Multiplex Access (OFDMA) systems, users do not share the channel in time but in frequency by transmitting on a (typically mutually exclusive) sub-set of the available sub-carriers. A set of sub-carriers may be grouped into a sub-channel with sub-channels allocated to users. Although the water filling principle still applies, the sharing of sub-carriers introduces an additional degree of freedom to the allocation of system resources for multiple access. Accordingly, it is necessary to consider different solutions for the problem of subcarrier and power allocation in an OFDMA, or multi-user OFDM system. It is likely that signals from different users will undergo independent fading because the users are likely not to be in the same location. Therefore, the probability of all the users' signals on the same subcarrier being subject to significant fading is very low. In a multi-user OFDM system, the data rate can be increased by exploiting multi-user diversity.

In OFDMA, allocating one subcarrier to one user typically prevents other users from using that subcarrier, since it is desirable to avoid the interference that arises when users share the same subcarrier. Hence, the optimal solution is not necessarily to assign the best subcarriers seen by a single chosen user (as in a single user system). This may be the case because, for example, it may happen that the best subcarrier of one user is also the best subcarrier for another user who happens to have no other good subcarriers. Hence, a different approach should be considered.

As stated above, an OFDMA system provides an extra degree of freedom since there are multiple sub-carriers available to be allocated, and it is this property that can be exploited. OFDMA matches well to the multi-user scenario; a subcarrier which is of low quality to one user can be of high quality to another user and can be allocated accordingly. By adaptively assigning sub-carriers, it is possible to take advantage of channel diversity among users in different locations. This "multi-user diversity" stems from channel diversity including independent path loss and fading of users. Previously considered solutions suggested possible subcarrier and power allocation algorithms for OFDMA systems. For example, see W. Rhee, J. M. Cioffi, "Increase in capacity of multi-user OFDM system using dynamic subchannel allocation", Vehicular Technology Conference Proceedings, 2000, IEEE 51$^{st}$, Volume: 2, 15-18 May 2000, Page(s): 1085-1089; and J. Jang, K. Bok Lee, "Transmit Power Adaptation for Multi-user OFDM Systems", IEEE Journal on Selected Areas in Communications, Volume: 21, Issue: 2, February 2003, Page(s): 171-178.

FIG. 1 illustrates channel diversity in a radio frequency telecommunications system. A base station 1 operates to transmit signals to mobile receivers 21 and 22. Obstacles, such as buildings 3, can cause the transmissions between the base station 1 and the mobile users 21 and 22 to take multiple paths 41 and 42. This phenomenon is well known and is known as multipath diversity. The signals arriving at the mobile receivers will vary in gain as a function of frequency, due to the varying lengths of the paths and reflections occurring on those paths. This means that different users receive different gain values for different subcarriers.

FIG. 2 illustrates a base station suitable for use in an OFDM or OFDMA system. The base station 10 receives data inputs $U_1, U_2 \ldots U_K$ from a plurality of users at an encoder 102. The encoder 102 encodes these user data signals $U_1$ to $U_K$ onto subcarriers $C_1, C_2 \ldots C_N$. A controller 108 allocates the subcarriers $C_1$ to $C_N$ to the users $U_1$ to $U_K$. A transmitter transformation unit 104 takes the subcarrier signals and applies an inverse fast Fourier transform (IFFT) and a parallel-to-serial conversion to produce a serial output data stream. This data stream is supplied to an output unit 106, which adds a cyclic prefix and converts the digital signal to analogue for transmission from an antenna 20, in known manner.

The controller 108 receives feedback signals $F_1$ to $F_K$ indicative of the channel subcarrier performance for each user. The controller 108 supplies control signals 110 on a control channel to the mobile receivers.

FIG. 3 illustrates a receiver for use in an OFDM system. Each user has a receiving antenna 30 connected to a user receiver 40. The user receiver 40 includes an input unit 402 which performs analogue-to-digital conversion of the incoming signal and removes the cyclic prefix which was added by the base station transmitter. The digital signal is then processed by a receiver transformation unit which applies a fast Fourier transform (FFT) and serial-to-parallel conversion to produce subcarrier signals $C_1$ to $C_N$. The subcarrier signals are received by a subcarrier selector 406 which, in dependence on received controlled signals 410, selects the subcarriers for the user K. These subcarriers are supplied to a decoder 408 which decodes the data signal relating to user K, to produce an output signal $D_K$.

Operation of the base station of FIG. 2 and the receiver of FIG. 3 will now be explained.

The controller 108 at the base station 10, having determined channel information from all users, allocates subcarriers to each user according to a subcarrier allocation algorithm. When the CSI (Channel State Information) is available at the transmitter, the transmitter can assign subcarriers to users and also adapt the transmit power in a symbol by symbol (or packet by packet) manner to increase data rate, assuming that the fading characteristics of the channel are constant for the symbol (or packet) duration.

In one previous solution mentioned, Rhee and Cioffi showed that since each subcarrier is assigned to a user whose channel gain is good for that subcarrier, there is no need for different power allocation among the subcarriers. Hence, the algorithm only needs to find the most appropriate subcarriers for all users and allocate equal power; this results in lower implementation complexity.

In the other previous solution mentioned, Jang and Bok Lee propose a transmit power allocation scheme and subcarrier allocation algorithm in the general case where users are allowed to share a subcarrier. In that case, if the transmit power for a specific users' signal is increased, the interference to other users' signals on the same subcarrier is also increased. However, after a mathematical analysis, it was found that the capacity is maximised if a subcarrier is assigned to only one user and hence no interference occurs (something that has become a fundamental assumption for all previous and future work). As with Rhee and Cioffi, it was found that equal power allocation is the best approach since water-filling over the allocated subcarriers will not give any significant gain and will increase computational complexity. In the final proposed scheme, only one user who has the best channel gain for that subcarrier transmits data at that subcarrier (for each subcarrier check which user has the best gain). It was also found that data rate is increased for increased number of users since it provides more multi-user diversity.

Although in the scheme proposed by Jang and Bok Lee the received average SNR for each subcarrier is increased and the average data rate is increased, this algorithm is not fair for the users. The number of subcarriers assigned to each user is not fixed, hence each user can have different data rates. Additionally, if it happens that one user does not have the best channel gain of the multiple users being considered for any of the subcarriers (for example, due to its location) then no subcarriers at all will be allocated to that user.

SUMMARY OF THE PRESENT INVENTION

Embodiments of the present invention can provide techniques for subcarrier allocation for a coded OFDMA system with fixed number of assigned subcarriers per subchannel. Embodiments employ channel coding, and so a metric is used which takes advantage of the channel coding properties. A low complexity algorithm is proposed that allocates the best possible subcarriers to every user based on that metric. In embodiments of the present invention, in addition to substantially improving downlink capacity, a fair subchannel distribution is employed that assigns a fixed number of subcarriers to each user and also ensures similar PER (packet error rate) and BER (bit error rate) performance for all users at the same SNR.

It should be clear that in all subcarrier allocation algorithms a certain amount of transmission overhead exists since the base station has to inform the mobile receivers about their allocated subcarriers. However this overhead can be relatively small, especially if the channels vary slowly.

According to the present invention, there is provided a method of allocating subcarriers to subchannels in a multi-user telecommunications system employing a plurality of subcarriers, the subchannels being allocated to at least one user, the method comprising:
a) allocating an initial subcarrier to each of a plurality of subchannels;
b) detecting a quality for each subchannel;
c) sorting the subchannels into ascending order of quality to produce an ordered list of subchannels;
d) allocating a further subcarrier to each subchannel, in an order determined by the ordered list of subchannels;

e) repeating steps c) and d) until all subcarriers are allocated.

In such a multi user communication system utilising an embodiment of the present invention, subcarriers are allocated to subchannels using measurement of quality for each subchannel. An initial sub-carrier is allocated to each subchannel, and the quality measured. Subsequent subcarriers are allocated in dependence upon the quality measurement of each subchannel. The subchannel with the lowest quality measurement receives the first allocation, and the subchannel with the highest quality measurement receives the last allocation. The subsequent allocation is repeated, following a re-sort of the subchannel quality measurements, until all of the subcarriers are allocated. In one embodiment, the quality measurement used is the power level available to a subchannel. Alternatively, the SINR (signal to interference and noise ratio) could be used as the quality measurement.

It will be readily appreciated that methods embodying the present invention are particularly applicable to radio frequency telecommunications systems. It will also be readily apparent that the principles of the present invention may be applied to other communication systems that employ other communication techniques.

It should be noted that the above-mentioned embodiment illustrates rather than limits the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. The singular reference of an element does not exclude the plural reference of such elements and vice-versa. The invention may be implemented by means of hardware comprising several distinct elements, and by means of a suitably programmed computer. In a claim enumerating several means, several of these means may be embodied by one and the same item of hardware. The mere fact that certain measures are recited in mutually different dependent claims does not indicate that a combination of these measures cannot be used to advantage.

DETAILED DESCRIPTION OF THE PREFERRED EMBODIMENTS

In an OFDM or OFDMA system, in the presence of multipath diversity, all subcarriers will arrive at a given receiver with different amplitudes. In fact, some subcarriers may be completely lost because of significant fading effects. Hence, the overall bit rate and capacity will be dominated by the few subcarriers with the smallest amplitudes (even though most subcarriers may be detected without errors).

In order to attempt to counteract this disadvantage, most OFDM or OFDMA systems employ channel coding. Using coding across the subcarriers, enables errors of weak subcarriers to be corrected. The performance of the coded OFDM/OFDMA system can be determined by the average received power rather than the power of the weakest subcarrier.

In the described embodiment of the present invention, the average received power (or channel gain) of each subchannel (user) will be used as the quality metric to allocate the subcarriers. The subcarriers are allocated in such a way as to maximise the average power received for each subchannel without minimising the average received power in other subchannels. This ensures a fair approach to all users (assuming for the moment each user is allocated one sub-channel) resulting in similar PER and BER performance across users under the same SNR.

Although power level is used as the quality metric in the described embodiment, it will be readily appreciated that the present invention is applicable to any quality measurement. For example, power level, or SINR (signal to Interference and Noise Ratio) could be used as a quality measurement as a basis for the allocation of subcarriers. Other quality measurements can also be used.

Figure 1:
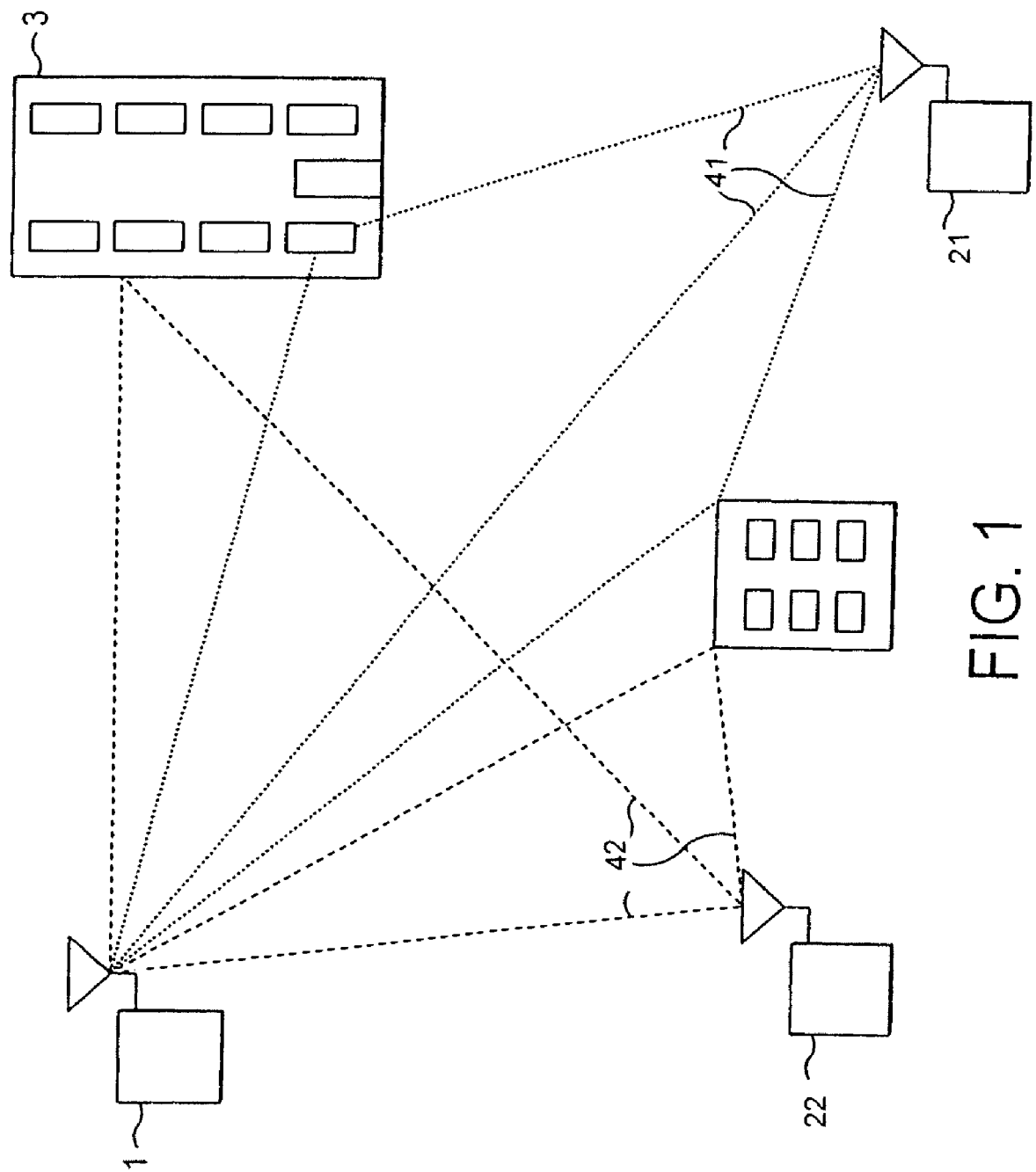
FIG. 1 illustrates multipath diversity in a radio telecommunications system.
Figure 2:
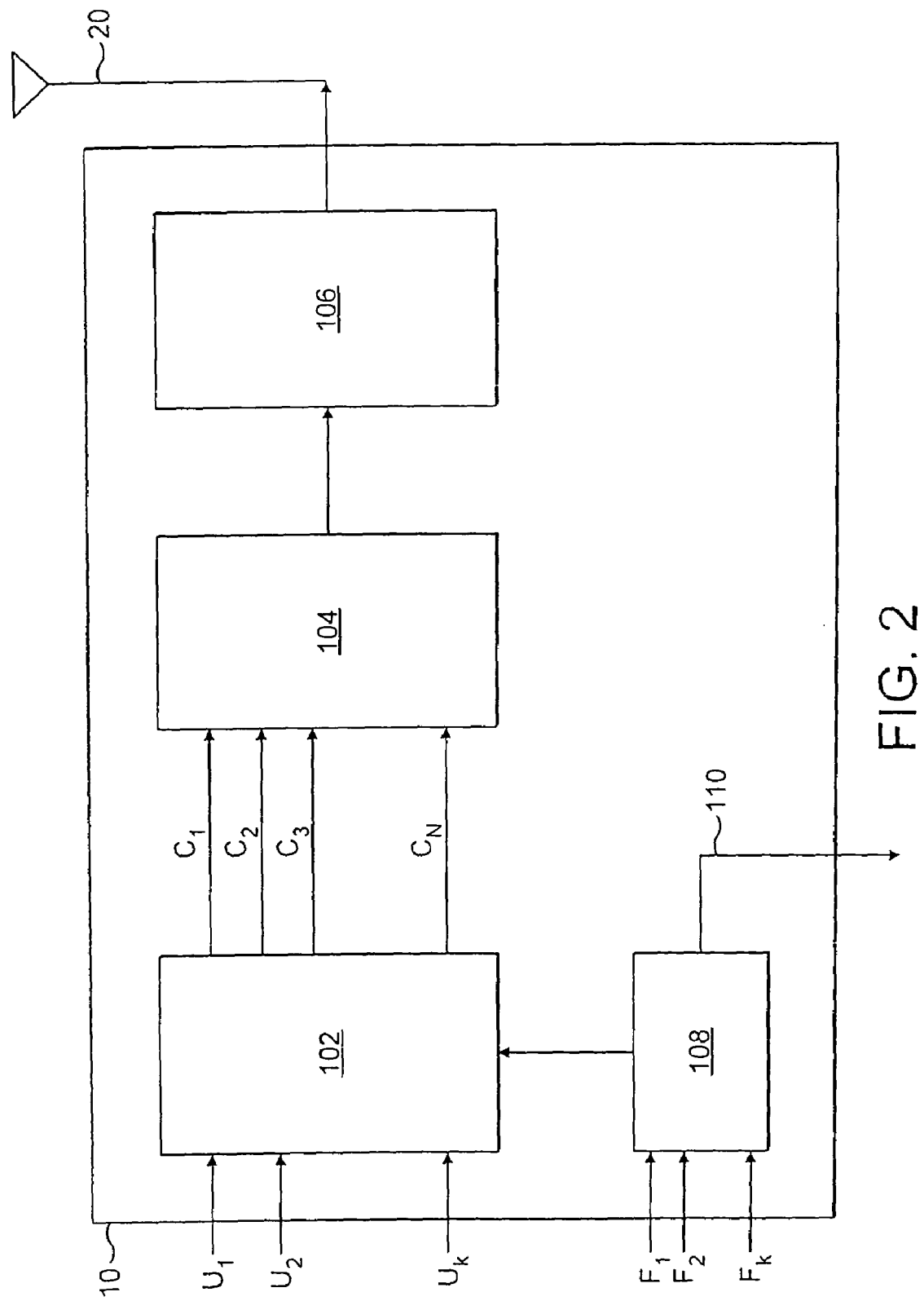
FIG. 2 is a block diagram illustrating a base station transmitter for use in an OFDM radio telecommunications system.
Figure 3:
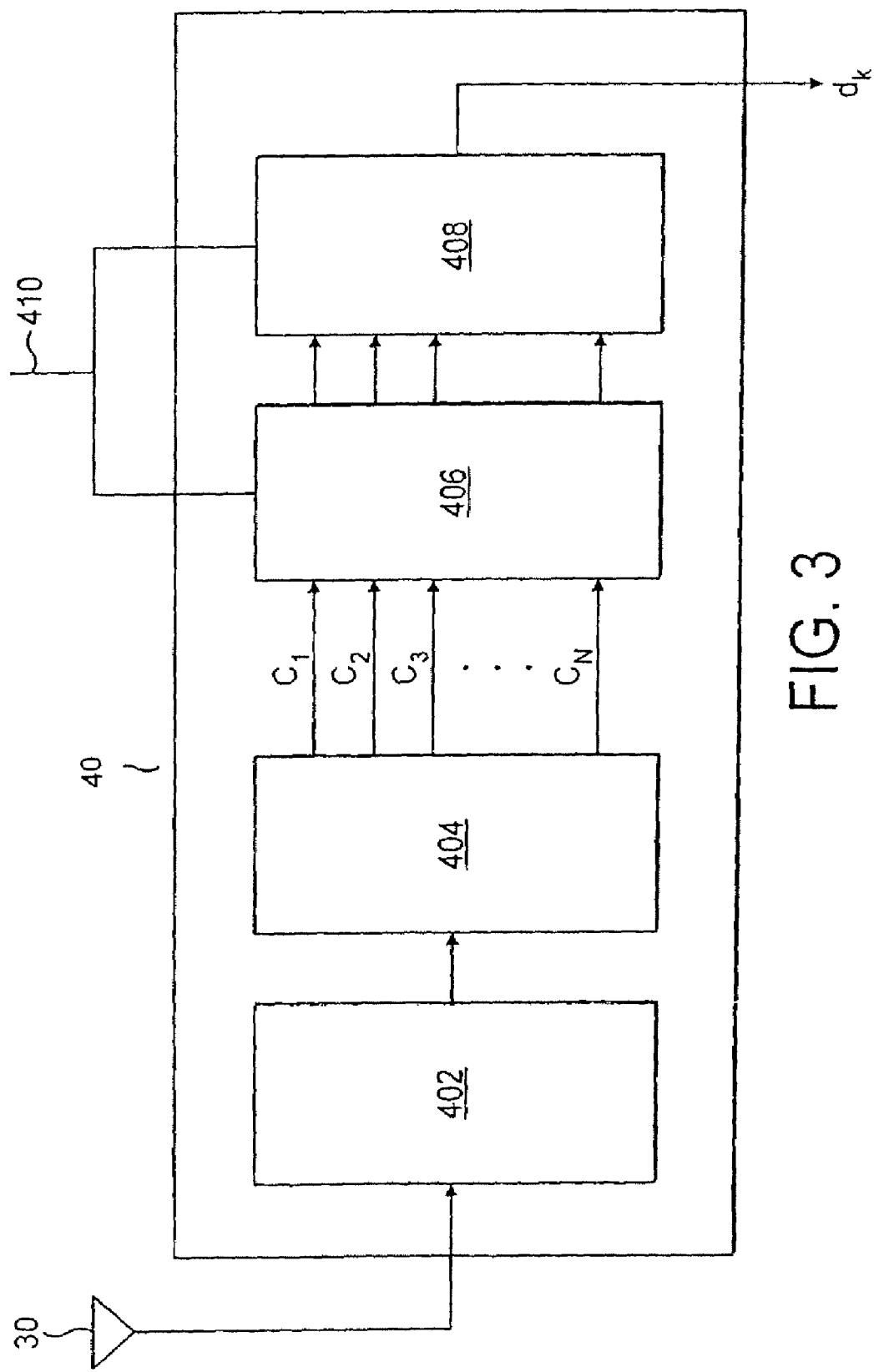
FIG. 3 is a block diagram illustrating a receiver for use in an OFDM radio communications system.
Figure 4:
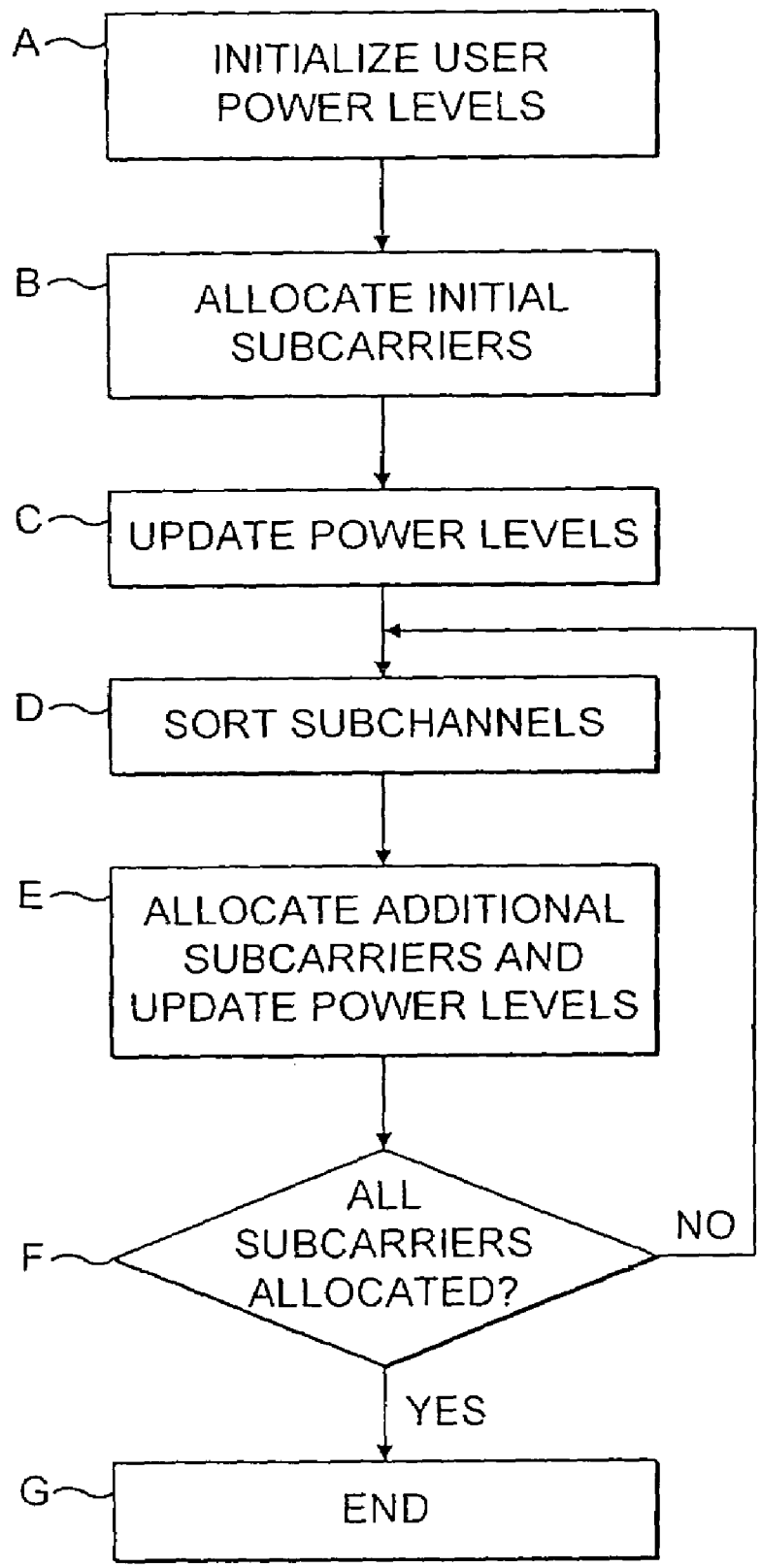
FIG. 4 is a flow chart illustrating steps in a method embodying the present invention.

FIG. 4 is a flow chart illustrating a method embodying the present invention. The method starts (at step A) by initialising data relating to subchannel power levels. For example, the initial level is set to zero. At step B, respective initial subcarriers are found for each subchannel. Each initial subcarrier is found to find the best subcarrier gain for that user. The power level is updated to reflect the allocated subcarriers, and once a subcarrier is allocated it is no longer available for allocation to another subchannel. At step D, the subchannels are sorted in ascending order of power level so that the lowest power level subchannel is first on the list. In step E, additional subcarriers are allocated in the order of the subchannels as they appear on the sorted power level list, such that the lowest power level subchannel is allocated an additional subcarrier first. If all subcarriers are allocated (step F) then the process ends (step G) until the next channel change. If all subcarriers have not been allocated then steps D and E are repeated so that all of the subcarriers can be allocated in this way.

$P_k$ represents the average received power for subchannel (user) k. N represents the usable subcarriers. $H_{k,n}$ represents the channel gain for subcarrier n and user k. In the following example, the number of subchannels (users) is 16, the number of subcarriers is 768 and for the sake of simplicity it is assumed that each user is allocated one subchannel only. Note that multiple subchannels may be allocated to particular users to give them a larger share of the available resources whilst maintaining a fair allocation of resources between subchannels. It will be readily appreciated that techniques embodying the invention can be applied to any number of users and subcarriers.

A method embodying the present invention can be expressed as follows:

1. Initialisation
    Set $P_k=0$ for all user k=1 to 16, N={1,2,3 . . . , 768} (available subcarriers)
2. First Time
    For every user k=1 to K
        a) Find subcarrier n satisfying $|h_{k,n}|>=|h_{k,j}|$ for all $j \subseteq N$
        b) Update $P_k$ and N with the n from a) according to:

$P_k=P_k+|h_{k,n}|^2, N=N-\{n\}$ remove this subcarrier from the available subcarriers
3. While N<>0 (until all subcarriers are allocated)
    a) Sort subchannels according to the subchannel that has less power.
    b) For the found subchannel k, find subcarrier n satisfying:

$|h_{k,n}|>=|h_{k,j}|$ for all $j \subseteq N$ c) Update $P_k$ and N with the n from a) according to:

$P_k=P_k+|h_{k,n}|^2, N=N-\{n\}$ d) Go to the next in the short list, until all users are allocated another subcarrier This technique will be repeated at regular intervals to accommodate variation over time.

Although the invention is described with reference to a radio telecommunications system, it will be readily appreciated that the techniques and principles of the invention are applicable to other systems.

In addition, although the techniques of the present invention are described with reference to the base station, it is not necessary that a base station carry out the subcarrier allocation. One or more, or even all, of the user terminals can handle the allocation of the subcarriers in a practical system.

Since the algorithm is deterministic, if all of the terminals have access to the same information on the channel, they could all implement the algorithm with the same result. In such a system, it is necessary that all of the terminals are provided with the relevant information concerning the channel, and this is particularly the case in those networks which use distributed control, with no base station. The information can be provided to each of the user terminals using the control channels available in the system.

In the following, physical layer performance results are presented for the case of the enhanced coded OFDMA system in terms of BER (bit error rate) and PER (packet error rate) vs. SNR (signal to noise ratio) graphs for the downlink case. Similar performance gains can be achieved in the uplink if the channel does not change and the user receiver uses the same subcarriers to transmit. Performance results have been obtained for a number of different modes for the channel mode E as specified. For each channel model, 2000 uncorrelated wideband Rayleigh channels were generated in order to be convolved with the modulated data.

Figure 5:
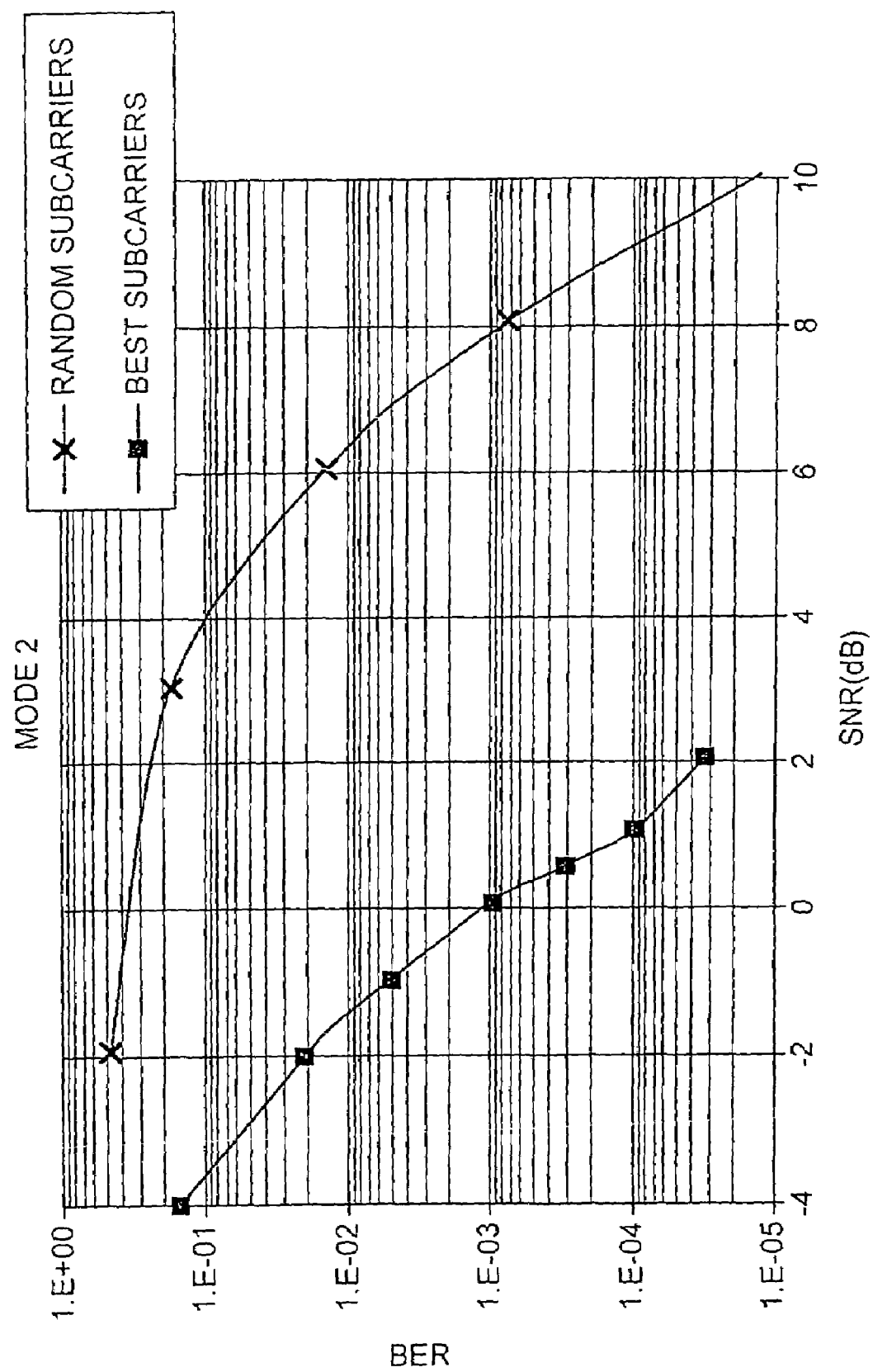
FIGS. 5 and 6 illustrate performance using a first subcarrier selection method.
Figure 6:
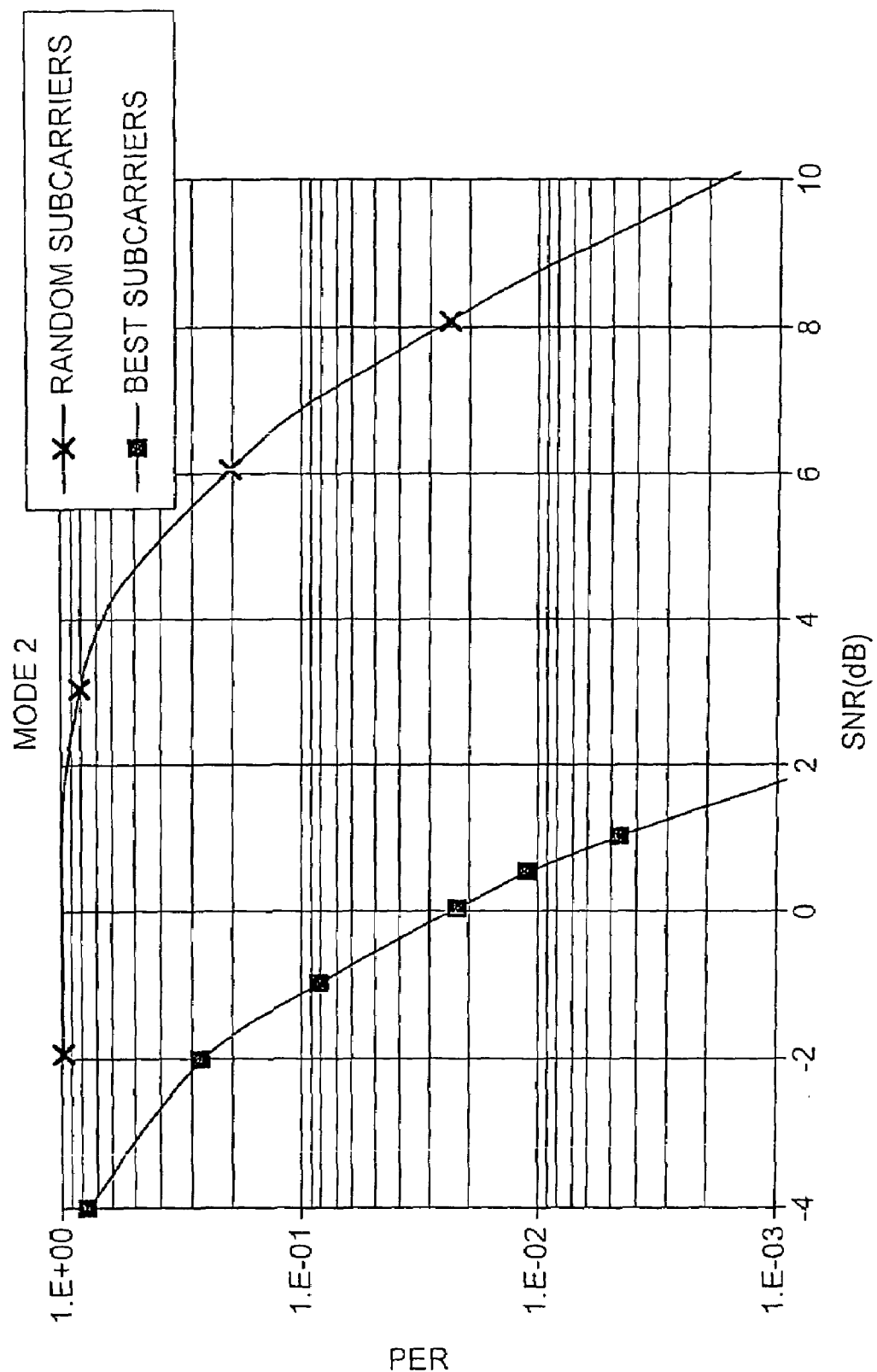

In order to investigate the potential gains achieved by allocating very good subcarriers to one user a simple greedy algorithm that allocates the best subcarriers to one user without taking into account the other users was tried. FIGS. 5 and 6 present the BER and PER performances of the coded OFDMA system versus SNR respectively. For these results mode 2 (see Table 2) was used and the packet size was 54 bytes. It can be seen that when the best subcarriers are allocated to one user the performance is significantly enhanced compared to the standard case where random subcarriers are allocated across the entire spectrum. This is due to two reasons. Firstly, the average received power for this user (in the 48 subcarriers) is increased and secondly fewer carriers are in a fade and hence the convolutional code can correct more errors and performance is improved. It should be noted that the average power across the entire spectrum remains the same, but what changes is the power for the particular user subcarriers.

However, as stated before, this is not the optimal solution since it may happen that the best subcarrier of a user is also the best subcarrier for another user who happens to have no other good subcarriers. This means that although the performance of user 1 has been enhanced, other users may suffer.

Figure 7:
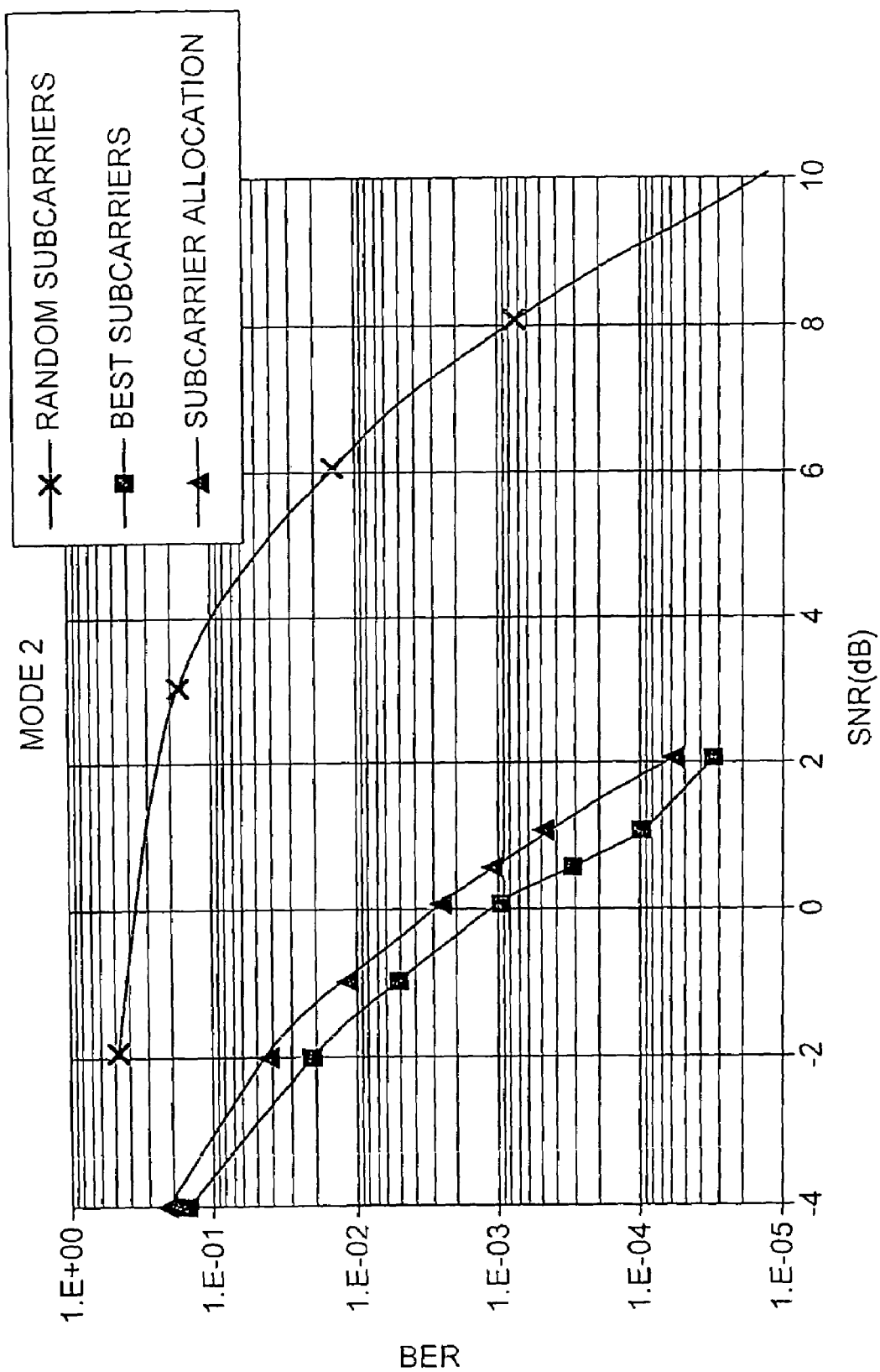
FIGS. 7 to 12 illustrate performance results for methods embodying the present invention.
Figure 8:
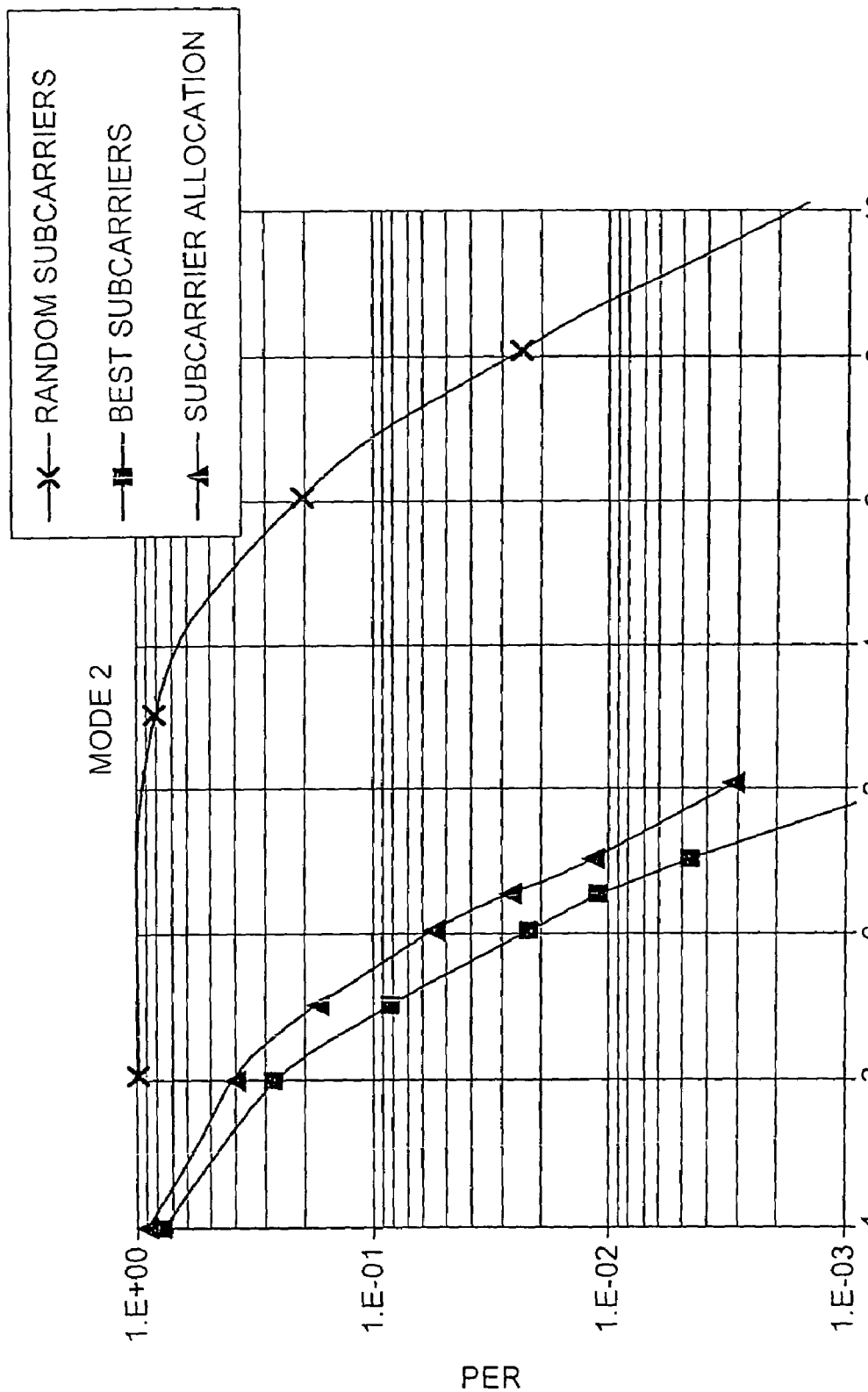
Figure 9:
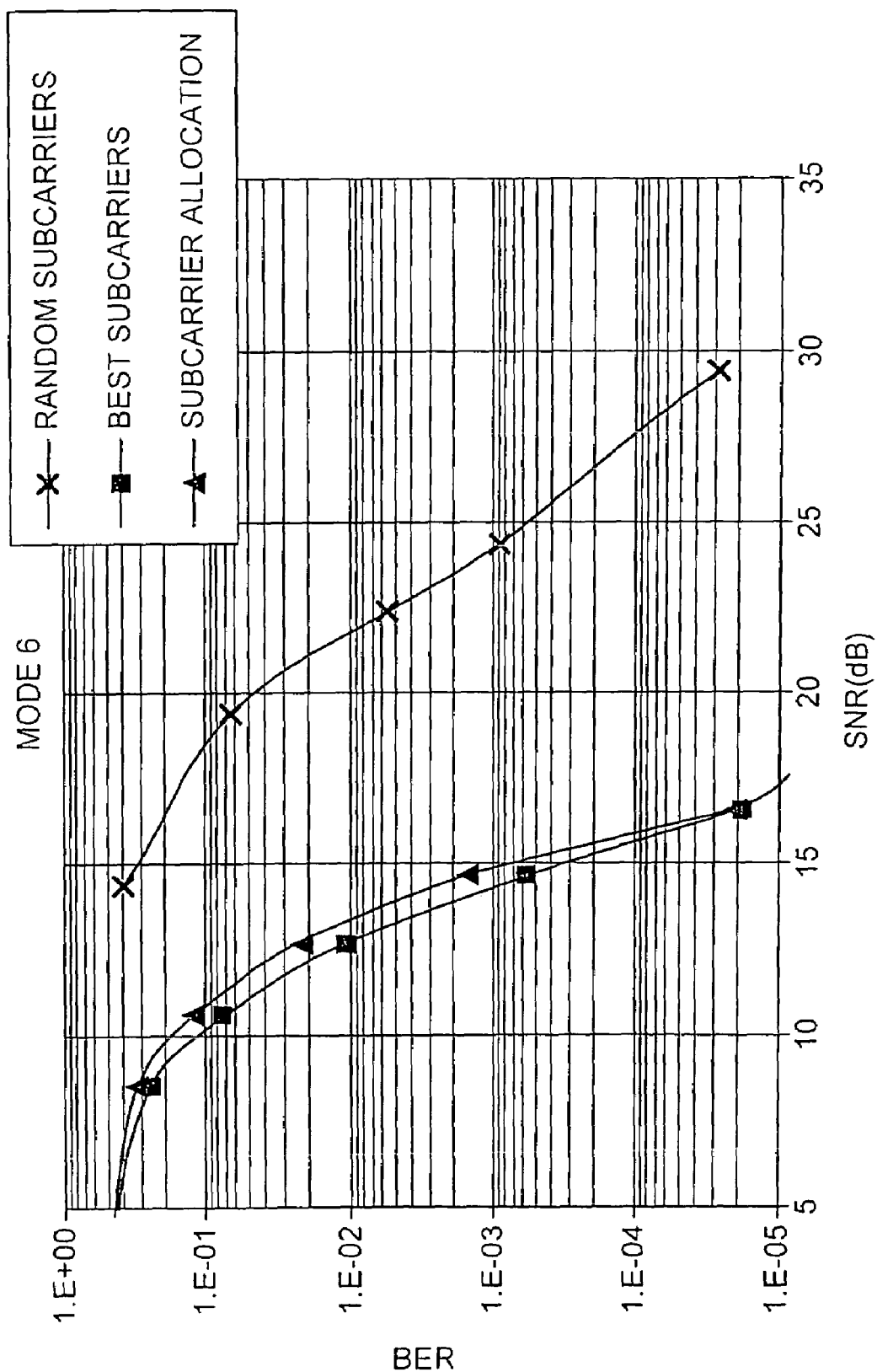
Figure 10:
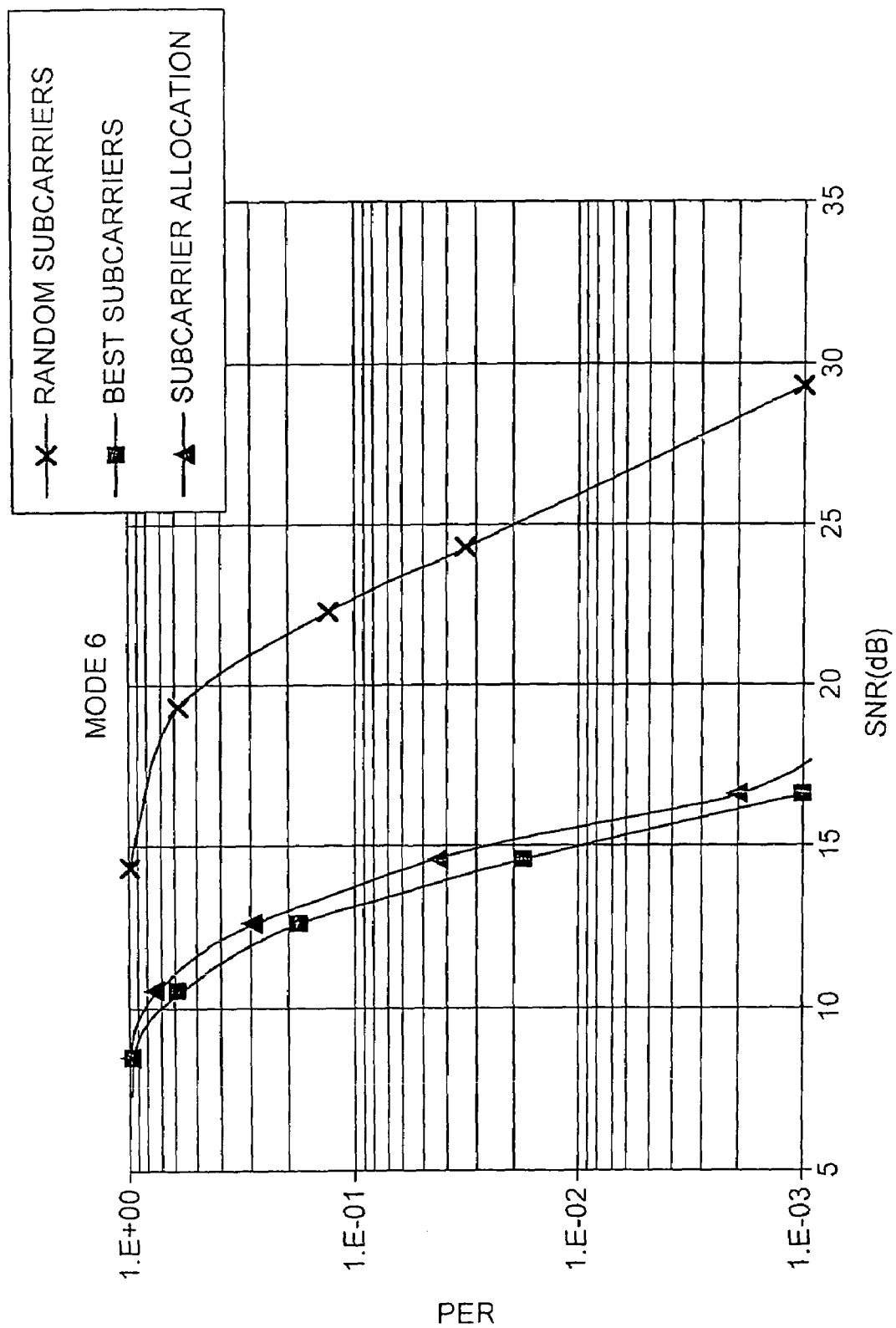
Figure 11:
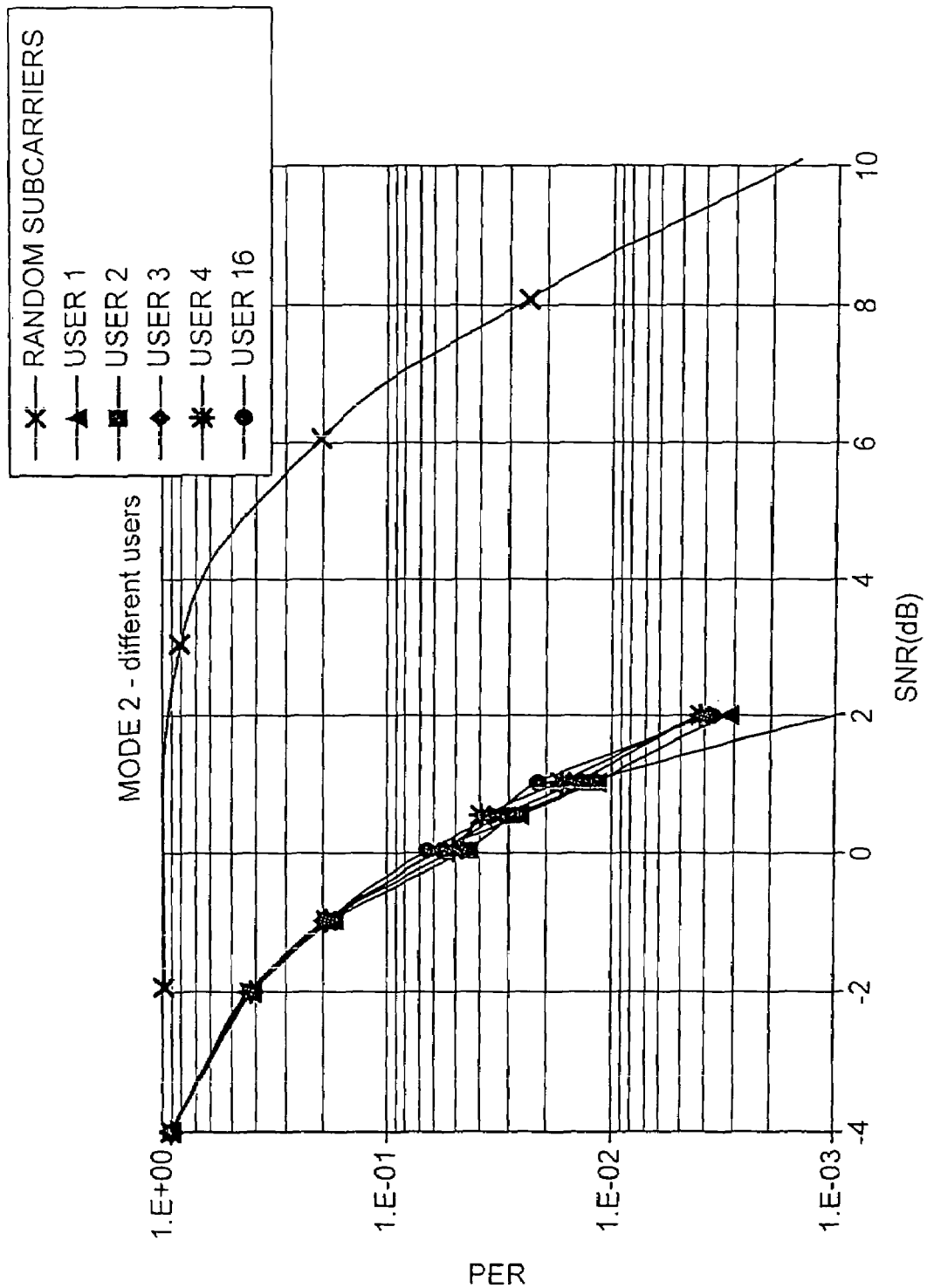

FIGS. 7 and 8 present the BER and PER performances of the coded OFDMA system with the subcarrier allocation algorithm versus SNR respectively for mode 2. FIGS. 9 and 10 present the BER and PER performances for mode 6 (see Table 2). It can be seen that the subcarrier allocation algorithm provides significant gains (see Table 1) and its performance is very close to the best subcarrier allocation case (within 1 dB). Moreover, as can be seen from FIG. 11 the performance of all users is equally enhanced in contrast with the best subcarrier allocation algorithm.

Figure 12:
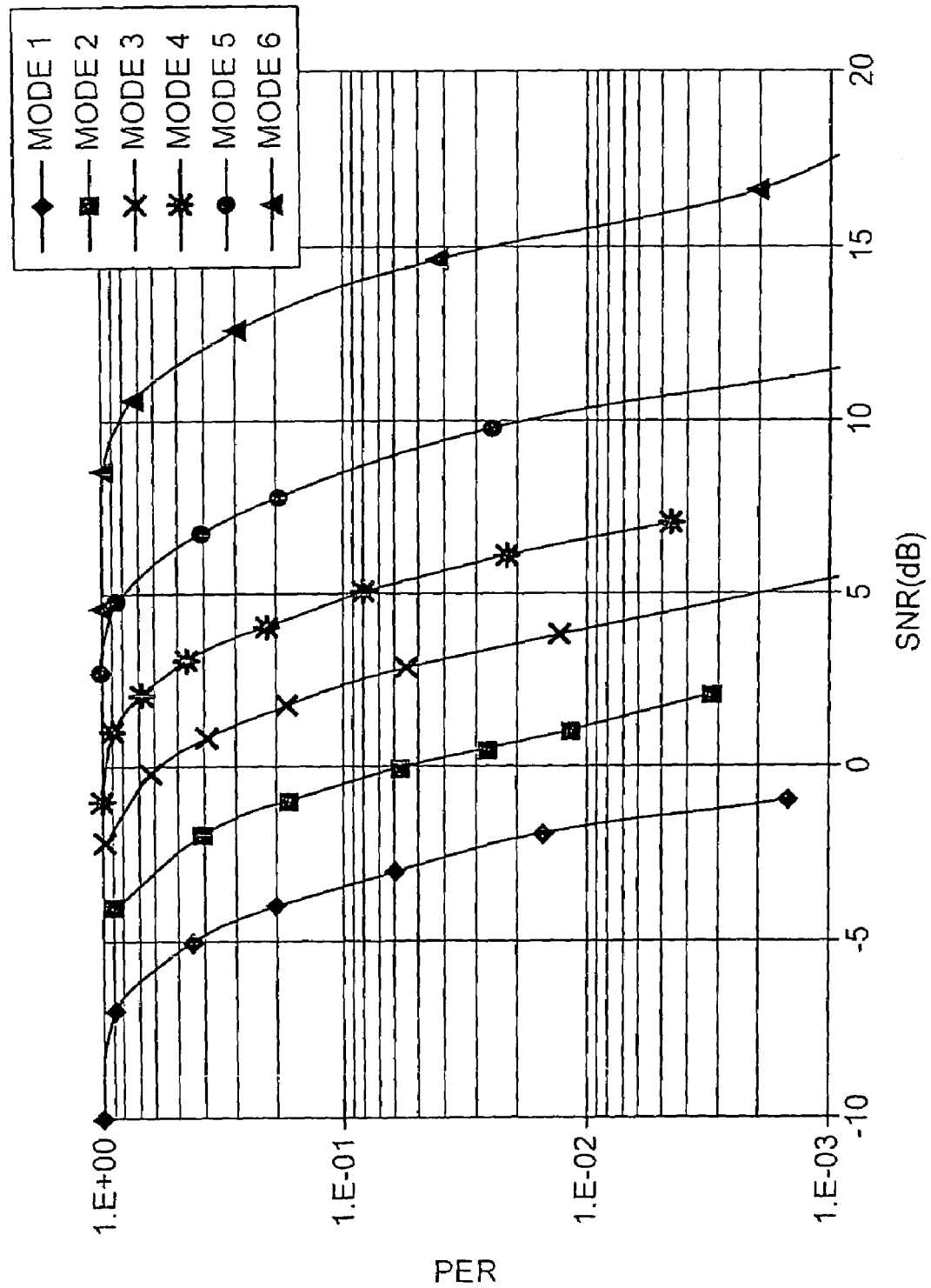

In order to obtain the throughput results, simulations were performed for all the transmission modes. FIG. 12 shows PER results with the subcarrier allocation algorithm for all the modes.

Figure 13:
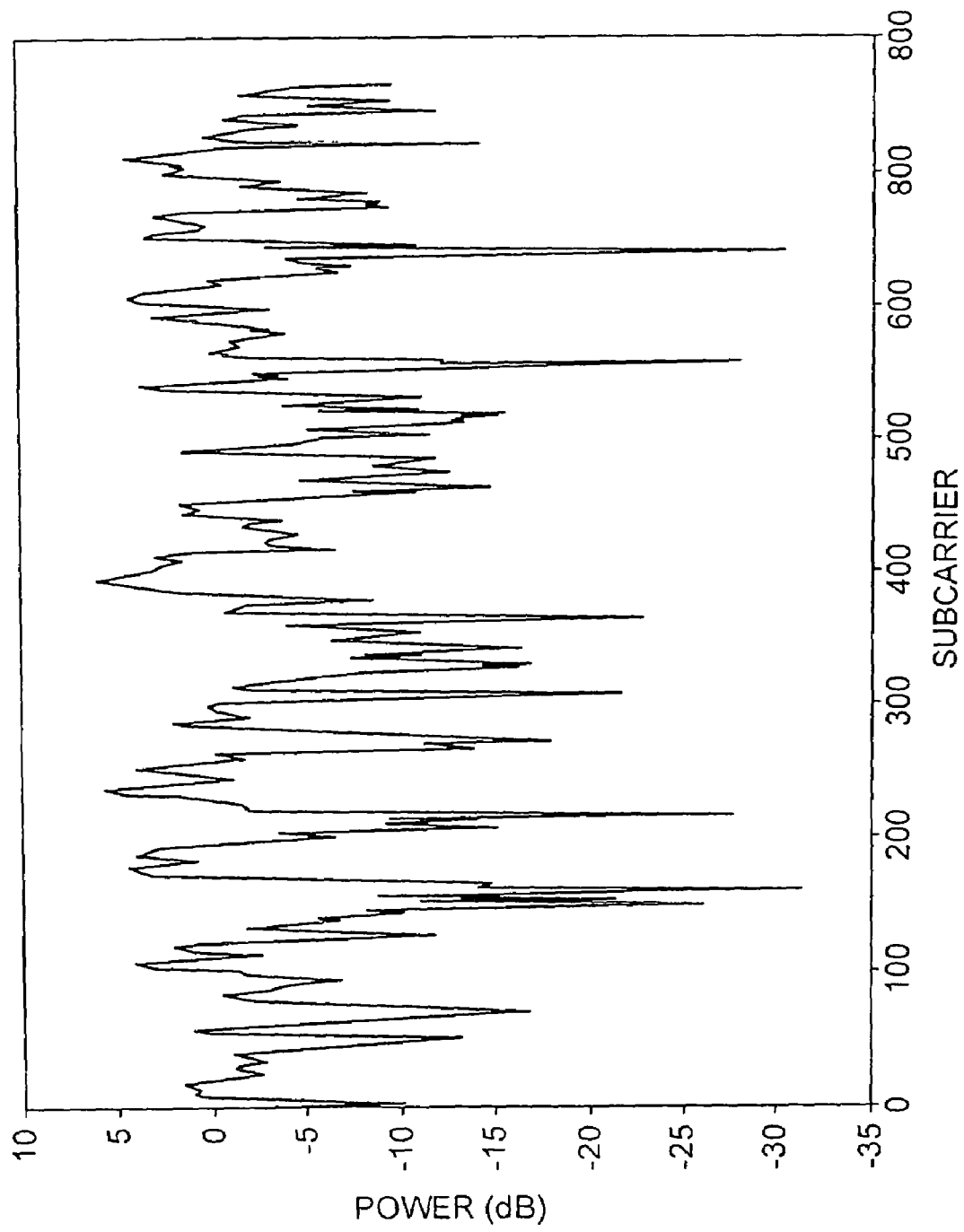
FIG. 13 illustrates an example of channel realisation frequency response.
Figure 14:
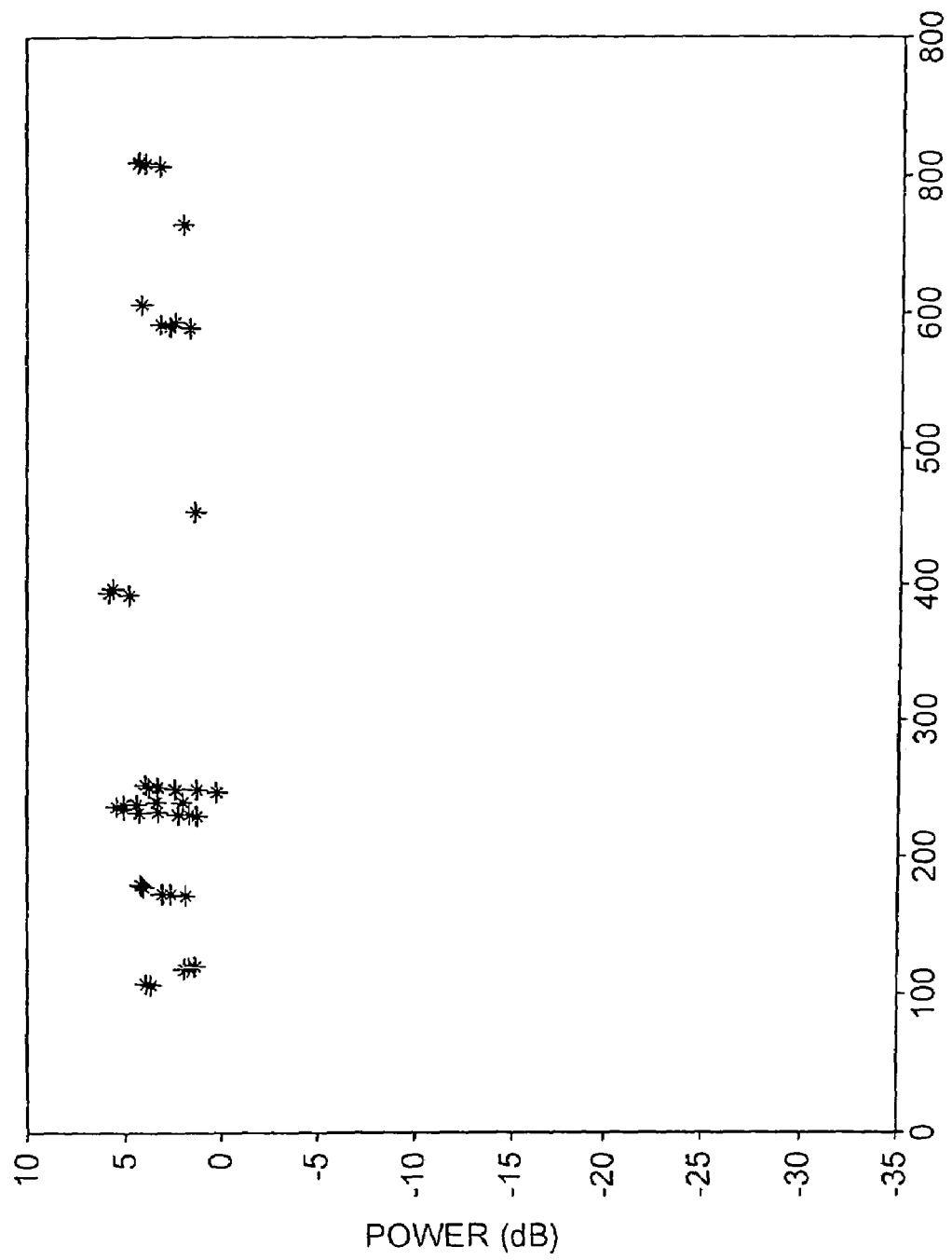
FIG. 14 illustrates subcarrier allocation for the frequency response of FIG. 13.

As before, the gains are due to enhanced received power in the desirable subcarriers and enhanced performance due to less fading. This can be seen from FIGS. 13 and 14 which show respectively an example channel frequency response and how that can be seen at the receiver after the subcarrier allocation algorithm for the 48 subcarriers. The average gain due to the enhanced received power was measured to be 4.8 dB (over all channel realisations and users). As stated before the rest of the gain is due to the resulting shape of the frequency response (see FIG. 12) which gives us a relatively flat channel.

TABLE 1

Gain at PER = $10^{-2}$

| Mode | Best Subcarrier | Subcarrier allocation Algorithm |
|---|---|---|
| 2 | 8 dB | 7.6 dB |
| 6 | 11 dB | 10 dB |

The physical layer modes (Table 2) with different coding and modulation schemes can be selected by a link adaptation scheme as explained in WP3. The link adaptation mechanism enables the system to adapt the transmission mode to the radio link quality.

Figure 15:
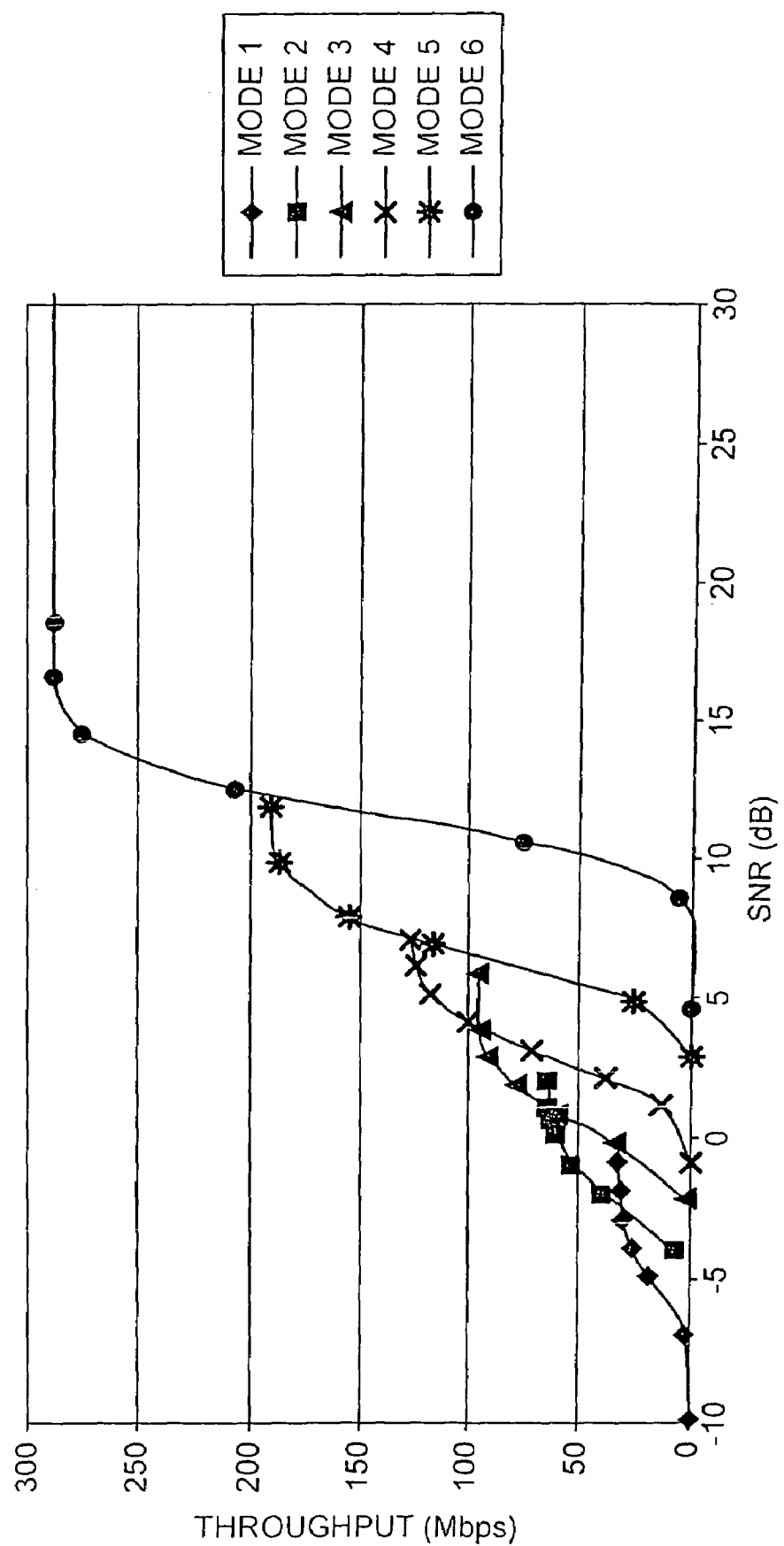
FIGS. 15 and 16 illustrate link throughput with and without the subcarrier allocation according to the present invention respectively.
Figure 16:
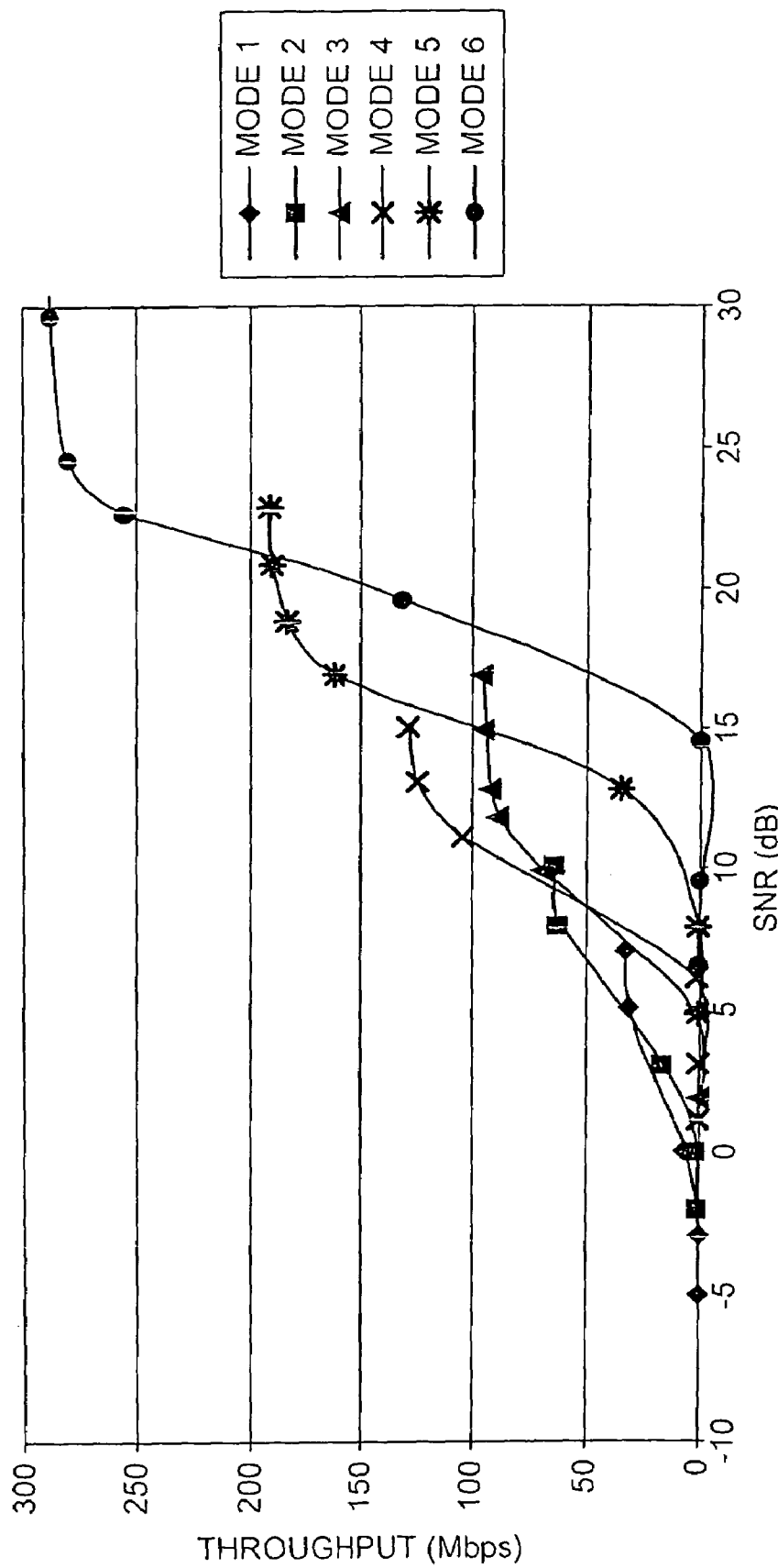

FIGS. 15 and 16 show the link throughput in the proposed 4G system based on the PER results and Table 2 with and without the subcarrier allocation algorithm for the downlink case.

It can be observed that throughput is significantly enhanced with the subcarrier allocation algorithm. The subcarrier allocation algorithm can achieve the maximum throughput (288 Mbps) for an SNR value of 18 dB for the downlink.

Table 3 summarises these throughput enhancements. For example at an SNR value of 5 dB the enhanced system can support up to 120 Mbps instead of 30 Mbps. This is due to the fact that mode 4 can now be used instead of Mode 2. Similar improvements can be seen for other SNR values. Hence the performance gain achieved can be used either to reduce the transmit power, or to provide enhanced capacity for the same transmit power.

TABLE 3

Throughput Enhancements

| SNR(dB) | Standard case | With the subcarrier allocation algorithm |
|---|---|---|
| −5 | — | 20 Mbps |
| 0 | 10 Mbps | 60 Mbps |
| 5 | 30 Mbps | 120 Mbps |
| 10 | 80 Mbps | 190 Mbps |
| 15 | 128 Mbps | 282 Mbps |
| 20 | 190 Mbps | 288 Mbps |
| 25 | 280 Mbps | 288 Mbps |

The invention claimed is:

1. A method of allocating subcarriers to subchannels in a multi-user telecommunications system employing a plurality of subcarriers, the subchannels being allocated to at least one user, the method comprising:
   a) allocating an initial subcarrier to each of a plurality of subchannels;
   b) detecting a quality for each subchannel based on the allocated subcarrier;
   c) sorting the subchannels into ascending order of quality to produce an ordered list of subchannels;
   d) allocating a further subcarrier to each subchannel, in an order determined by the ordered list of subchannels;

TABLE 2

Modulation parameters for 4 G

| Mode | Modulation | Coding Rate, R | Data bits per sub-channel [1] (48 subcarriers) | Data bits per OFDMA symbol (all 16 sub-channels) | Total Bit Rate [Mbit/s] | Coded bits per sub-channel [1] (48 subcarriers) |
|---|---|---|---|---|---|---|
| 1 | BPSK | ½ | 24 | 384 | 32 | 48 |
| 2 | QPSK | ½ | 48 | 768 | 64 | 96 |
| 3 | QPSK | ¾ | 72 | 1152 | 96 | 96 |
| 4 | 16QAM | ½ (or 9/16) | 96 (108) | 1536 (1728) | 128 (144) | 192 |
| 5 | 16QAM | ¾ | 144 | 2304 | 192 | 192 |
| 6 | 64QAM | ¾ | 216 | 3456 | 288 | 288 | e) repeating steps c) and d) until all subcarriers are allocated.

2. A method as claimed in claim 1, wherein the step of detecting a quality for each subchannel includes receiving feedback data indicative of subchannel quality measurements.

3. A method as claimed in claim 1 or 2, wherein the telecommunications system is a wireless communications system.

4. A method as claimed in claim 3, wherein the telecommunications system is a radio frequency telecommunications system.

5. A method as claimed in claim 4, wherein the radio frequency telecommunications system is an orthogonal frequency division multiple access OFDMA system.

6. A method as claimed in claim 5, wherein the allocation is performed by a base station of the telecommunications system.

7. A method as claimed in claim 6, wherein the allocation is performed by at least one of terminals of the telecommunications system.

8. A method as claimed in claim 7, wherein each user is a mobile terminal.

9. A method as claimed in claim 8, wherein the quality measurement is a power level measurement.

10. A method as claimed in claim 8, wherein the quality measurement is a SINR (Signal to Interference and Noise Ratio).

11. A method of transmitting data from a base station to a terminal in a telecommunications system employing a plurality of subcarriers at respective subcarrier frequencies, the method comprising:
    allocating subcarriers to each of a plurality of subchannels;
    allocating at least one subchannel to each terminal;
    transmitting data from a base station to a terminal on the subchannel allocated to that terminal,
    wherein allocating subcarriers to each of a plurality of subchannels comprises the steps of:
    a) allocating an initial subcarrier to each of the plurality of subchannels;
    b) detecting a quality for each subchannel based on the allocated subcarrier;
    c) sorting the subchannels into ascending order of quality to produce an ordered list of subchannels;
    d) allocating a further subcarrier to each subchannel, in an order determined by the ordered list of subchannels;
    e) repeating steps c) and d) until all subcarriers are allocated.

12. A method as claimed in claim 11, wherein the step of detecting a quality for each subchannel includes receiving feedback data indicative of subchannel quality measurements.

13. A method as claimed in claim 11 or 12, wherein the telecommunications system is a wireless communications system.

14. A method as claimed in claim 13, wherein the telecommunications system is a radio frequency telecommunications system.

15. A method as claimed in claim 14, wherein the radio frequency telecommunications system is an orthogonal frequency division multiple access OFDMA system.

16. A method as claimed in claim 15, wherein the allocation is performed by a base station of the telecommunications system.

17. A method as claimed in claim 16, wherein the allocation is performed by at least one of terminals of the telecommunications system.

18. A method as claimed in claim 17, wherein each terminal is a mobile terminal.

19. A method as claimed in claim 18, wherein the quality measurement is a power level measurement.

20. A method as claimed in claim 18, wherein the quality measurement is a SINR (Signal to Interference and Noise Ratio).

21. A telecommunications system comprising:
    a base station operable to transmit signals to a plurality of terminals, the signals being transmitted on respective subchannels to which subcarriers are allocated;
    at least one terminal operable to -receive a subchannel communication from the base station; and
    an allocation unit operable to allocate subcarriers to subchannels, and to allocate subchannels to terminals, wherein the allocation unit is operable to:
    a) allocate an initial subcarrier to each of a plurality of subchannels;
    b) detect a quality for each subchannel based on the allocated subcarrier;
    c) sort the subchannels into ascending order of quality to produce an ordered list of subchannels;
    d) allocate a further subcarrier to each subchannel, in an order determined by the ordered list of subchannels;
    e) repeat steps c) and d) until all subcarriers are allocated, 22. A system as claimed in claim 21, wherein the base station is operable to:
    allocate subcarriers to each of a plurality of subchannels;
    allocate at least one subchannel to each terminal;
    transmit data from a base station to a terminal on the subchannel allocated to that terminal.

23. A system as claimed in claim 21 or 22, wherein the allocation unit is operable to receive feedback data indicative of subchannel quality.

24. A system as claimed in claim 23, wherein the telecommunications system is a wireless communications system.

25. A system as claimed in claim 24, wherein the telecommunications system is a radio frequency telecommunications system.

26. A system as claimed in claim 25, wherein the radio frequency telecommunications system is an orthogonal frequency division multiple access OFDMA system.

27. A system as claimed in claim 26, wherein the allocation unit is provided by the base station.

28. A system as claimed in claim 26, wherein the allocation unit is provided by at least one terminal.

29. A system as claimed in claim 28, wherein each terminal is a mobile terminal.

30. A system as claimed in claim 29, wherein the quality measurement is a power level measurement.

31. A system as claimed in claim 29, wherein the quality measurement is a SINR (Signal to Interference and Noise Ratio).

32. A base station for a telecommunications system, the base station comprising:
    a transmitting unit operable to transmit the signals to a plurality of terminals, the signals being transmitted on respective subchannels to which subcarriers are allocated;
    an allocation unit operable to allocate subcarriers to subchannels, and to allocate subchannels to terminals, where the allocation unit is operable to:
    a) allocate an initial subcarrier to each of a plurality of subchannels;
    b) detect a quality for each subchannel based on the allocated subcarrier;
    c) sort the subchannels into ascending order of quality to produce an ordered list of subchannels;
    d) allocate a further subcarrier to each subchannel, in an order determined by the ordered list of subchannels;
    e) repeat steps c) and d) until all subcarriers are allocated.

33. A base station as claimed in claim 31 operable to:
    allocate subcarriers to each of a plurality of subchannels;
    allocate at least one subchannel to each terminal;
    transmit data from a base station to a terminal on the subchannel allocated to that terminal.

34. A base station as claimed in claim 32 or 33, wherein the allocation unit is operable to receive feedback data indicative of subchannel quality.

35. A base station as claimed in claim 34, wherein the telecommunications system is a wireless communications system.

36. A base station as claimed in claim 35, wherein the telecommunications system is a radio frequency telecommunications system.

37. A base station as claimed in claim 36, wherein the radio frequency telecommunications system is an orthogonal frequency division multiple access OFDMA system.

38. A base station as claimed in claim 37, wherein each terminal is a mobile terminal.

39. A base station as claimed in claim 38, wherein the quality measurement is a power level measurement.

40. A system as claimed in claim 38, wherein the quality measurement is a SINR (Signal to Interference and Noise Ratio).

41. A terminal for receiving a subchannel transmitted from a base station, the terminal comprising:
- a reception unit operable to receive a subchannel transmitted from a base station, the subchannel being allocated to the terminal;
- a detection unit operable to detect a quality for the subchannel allocated to the terminal;
- a transmission unit operable to transmit a detected quality to a base station;
- wherein the terminal receives the subchannel determined by the base station, which is operable to:
  a) allocate an initial subcarrier to each of a plurality of subchannels;
  b) detect the quality, which transmitted from the terminal, for each subchannel based on the allocated subcarrier;
  c) sort the subchannels into ascending order of quality to produce an ordered list of subchannels;
  d) allocate a further subcarrier to each subchannel, in an order determined by the ordered list of subchannels;
  e) repeat c) and d) until all subcarriers are allocated.

42. A terminal as claimed in claim 41, wherein the telecommunications system is a wireless communications system.

43. A terminal as claimed in claim 42, wherein the telecommunications system is a radio frequency telecommunications system.

44. A terminal as claimed in claim 43, wherein the radio frequency telecommunications system is an orthogonal frequency division multiple access OFDMA system.

45. A terminal as claimed in any one of claims 41 to 44, further comprising an allocation unit for allocating the subchannels.

46. A terminal as claimed in claim 45, being a mobile terminal.

47. A terminal as claimed in claim 46, wherein the quality measurement is a power level measurement.

48. A terminal as claimed in claim 47, wherein the quality measurement is a SINR (Signal to Interference and Noise Ratio).

* * * * *